United States Patent [19]
Bergeron

[11] Patent Number: 5,316,330
[45] Date of Patent: May 31, 1994

[54] AUTOMATIC COUPLING AND DECOUPLING HITCH SYSTEM

[76] Inventor: Rénald Bergeron, 114, Route 265 Sud, Ste-Sophie, Québec, Canada, G0P 1L0

[21] Appl. No.: 40,979

[22] Filed: Mar. 31, 1993

[51] Int. Cl.$^5$ ............................................. B60D 1/00
[52] U.S. Cl. ..................................... 280/477; 172/274
[58] Field of Search ................ 280/475, 477; 37/231; 172/272, 274, 275

[56] References Cited

U.S. PATENT DOCUMENTS

| | | | |
|---|---|---|---|
| 1,033,766 | 7/1912 | Slauson | 280/475 |
| 2,048,310 | 7/1936 | Wohldorf | 280/477 |
| 2,904,348 | 9/1959 | Quastad | 280/477 |
| 2,920,907 | 1/1960 | Bremer | 280/477 |
| 3,037,794 | 6/1962 | Richman | 280/449 |
| 3,046,037 | 7/1962 | Cain | 280/475 |
| 3,201,144 | 8/1965 | Smyser | 280/477 |
| 3,319,977 | 5/1967 | Quandt et al. | 280/475 |
| 3,325,186 | 6/1967 | Lund | 280/477 |
| 4,225,149 | 9/1980 | Koopman | 280/477 |
| 4,482,166 | 11/1984 | Van Antwerp | 280/479 |
| 4,799,705 | 1/1989 | Janes et al. | 280/477 |

OTHER PUBLICATIONS

Attach-Matic Inc. "Attach system entirely automatic for forage harvesters, balers, tractors, etc." pp. 1 & 2.

Primary Examiner—Margaret A. Focarino
Assistant Examiner—Victor E. Johnson

[57] ABSTRACT

To automatically hitch a trailer to a motor vehicle, a first hitch section is mounted on the motor vehicle and a second hitch section is mounted on the forwardly extending tongue of the trailer. The second hitch section comprises a hitch pin vertically mounted on the free end of the trailer's tongue and a guidable member formed of a ground-engaging lower portion and a pyramidal upper portion defining a vertex welded to the lower end of the hitch pin. The pyramidal upper portion is formed with a V-shaped recess that slides on a ramp of the first hitch section to guide the hitch pin toward a mechanism capable of detachably connecting the hitch pin to the first hitch section. The pyramidal configuration enables easy adjustment of the second hitch section to most of the trailer tongues. The ground-engaging portion may include two legs normally placed into a ground-engaging position but mounted on the guidable member for pivoting when they hit the ground while the vehicle is moving. An helicoidal spring is installed between a point of the legs distant from their pivotal connection and a point of the tongue distant from the tongue's free end to return the legs to their ground-engaging position following pivoting thereof.

14 Claims, 3 Drawing Sheets

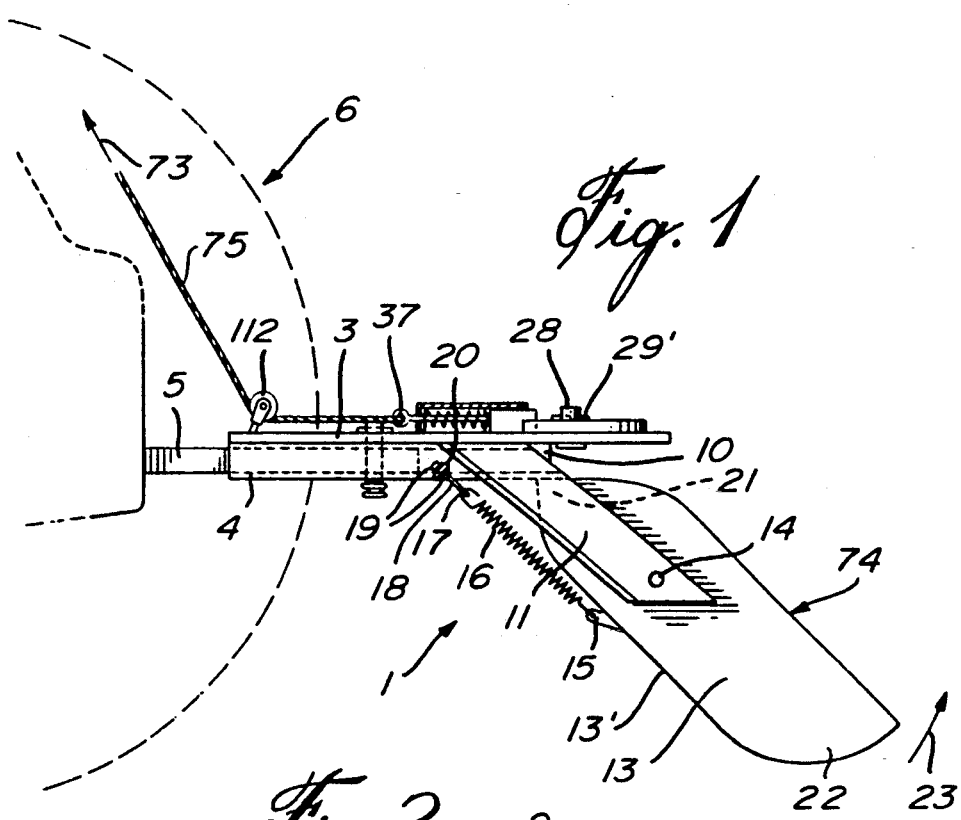
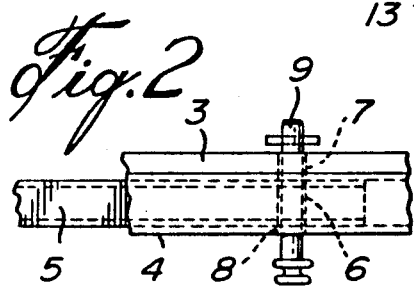
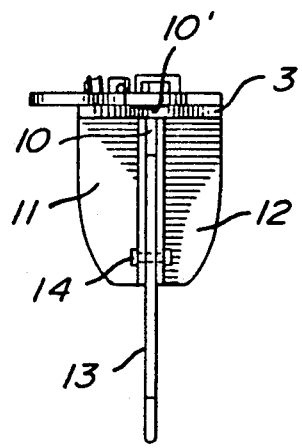
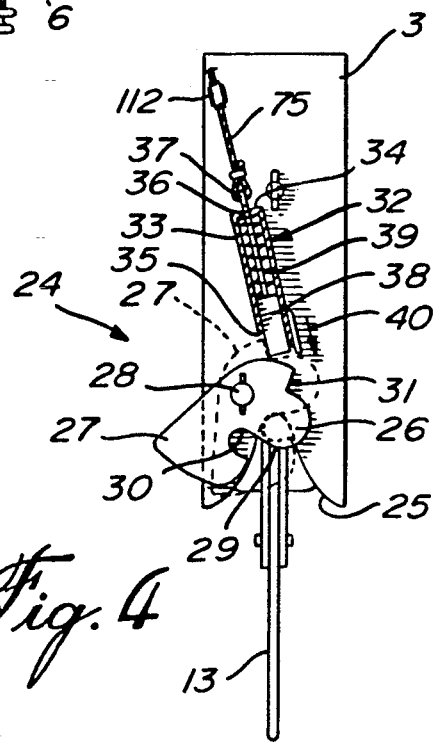

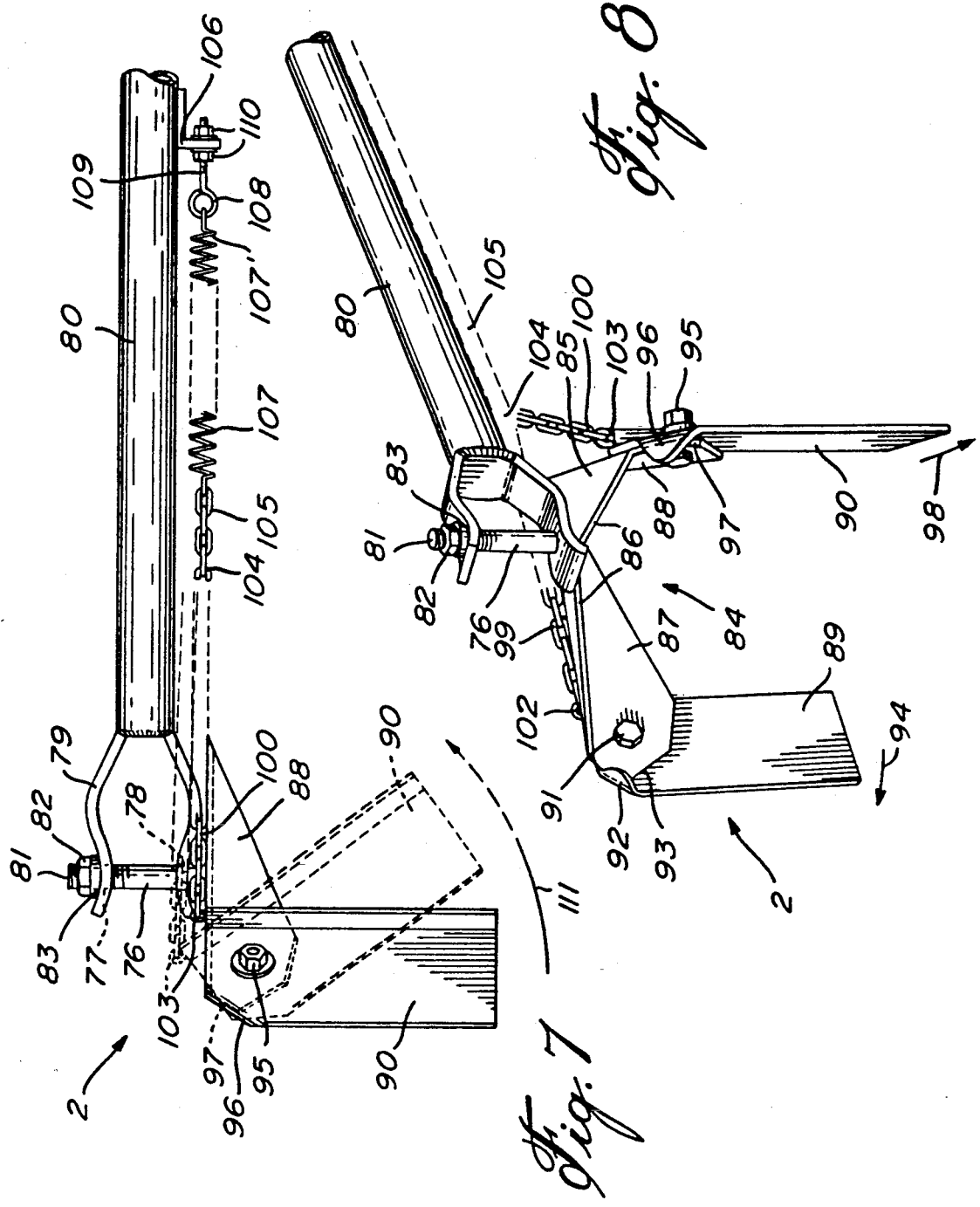

AUTOMATIC COUPLING AND DECOUPLING HITCH SYSTEM

BACKGROUND OF THE INVENTION

1. Field of the Invention

The present invention relates to a system for hitching a trailing vehicle to a towing vehicle, in which a first hitch section is mounted on the towing vehicle and a second hitch section is mounted on the forwardly extending tongue of the trailing vehicle, and in which the second hitch section can be detachably coupled to the first hitch section.

2. Brief Description of the Prior Art

U.S. Pat. No. 3,037,794 (Richman, Jr) granted on Jun. 5, 1962 describes and illustrates a hitch system of the above mentioned type. However, the hitch system of Richman, Jr has the two following drawbacks:

the second hitch section is mounted on a specially designed trailer tongue. Therefore, it does not adapt to different configurations of conventional trailer tongues; and the second hitch section comprises two ground-engaging legs that are fixedly secured to the free end of the trailer tongue. Accordingly, these legs can be damaged if they hit the ground while the towing vehicle and trailer are moving.

OBJECT OF THE INVENTION

An object of the present invention is therefore to eliminate the above discussed drawbacks of the prior art.

SUMMARY OF THE INVENTION

More specifically, in accordance with the present invention, there is provided a hitch section to be mounted on a trailing vehicle to be hitched to a towing vehicle, this trailing vehicle including a forwardly extending tongue provided with a free end. The hitch section of the invention comprises:

a hitch pin to be mounted generally vertically on the tongue free end whereby the pin has a lower end; and a guidable means having a ground-engaging lower portion and a pyramidal upper portion defining a vertex secured to the lower end of the hitch pin.

The pyramidal upper portion is formed with a generally flared guide recess capable, upon moving the towing vehicle toward the trailing vehicle, of engaging and sliding on a ramp means of the towing vehicle in order to guide the hitch pin toward a mechanism for detachably connecting this pin to the towing vehicle.

As it will become apparent in the following description, the pyramidal configuration of the upper portion of the guidable means enables adaptation of the hitch section to many configurations of tongue.

The present invention also relates to a hitch section to be mounted on a trailing vehicle to be hitched to a towing vehicle, the trailing vehicle including a forwardly extending tongue provided with a free end. The hitch section according to the invention comprises:

a hitch pin to be mounted generally vertically on the free end of the tongue whereby the pin has a lower end;

a guidable means having (a) an upper portion secured to the lower end of the pin and formed with a generally flared guide recess, and (b) a lower portion including at least one ground-engaging leg normally placed into a ground-engaging position but mounted on the upper portion for pivoting when the aforementioned leg hits the ground while the towing vehicle is moving; and means for returning the leg to its ground-engaging position after pivoting thereof from the latter position.

Upon moving the towing vehicle toward the trailing vehicle, the flared recess is capable of engaging and sliding on a ramp means of the towing vehicle in order to guide the hitch pin toward a mechanism for detachably connecting the pin to the towing vehicle.

As can be appreciated, pivoting of the leg will prevent damage thereto when it hits the ground while the towing vehicle is moving. Moreover, this will prevent the leg to drag cultivated soil.

Also in accordance with the present invention, there is provided a system for hitching to a towing vehicle a trailing vehicle including a forwardly extending tongue provided with a free end, comprising a first hitch section to be mounted on the towing vehicle and a second hitch section to be mounted on the trailing vehicle. The second hitch section comprises:

a hitch pin to be mounted generally vertically on the free end of the tongue whereby this pin has a lower end; and a guidable means having a ground-engaging lower portion and a pyramidal upper portion defining a vertex secured to the lower end of the hitch pin, the pyramidal upper portion being formed with a generally flared guide recess.

The first hitch section comprises:

a mechanism for detachably connecting the hitch pin to the first hitch section; and a ramp means which, upon moving the towing vehicle toward the trailing vehicle, engages the flared recess whereby this flared recess slides on the ramp means in order to guide the hitch pin toward the aforementioned mechanism.

Preferably, the pyramidal upper portion defines a plurality of triangular walls, and the flared recess is formed by the absence of one of these triangular walls.

According to an advantageous embodiment, the hitch pin is pivotally mounted on the free end of the tongue, and the second hitch section further comprises a tension spring means having a first end connected to the guidable means and a second end connectable to a point of the tongue distant from the free end thereof. The spring means produces a tension force capable of returning the guidable means and hitch pin to a substantially stable angular position after pivoting of these guidable means and hitch pin from this stable position.

Further in accordance with the present invention, there is provided a system for hitching to a towing vehicle a trailing vehicle including a forwardly extending tongue provided with a free end, comprising a first hitch section to be mounted on the towing vehicle and a second hitch section to be mounted on the trailing vehicle, wherein the second hitch section comprises:

a hitch pin to be mounted generally vertically on the free end of the tongue whereby the pin has a lower end;

a guidable means having (a) an upper portion secured to the lower end of the pin and formed with a generally flared guide recess, and (b) a lower portion including at least one ground-engaging leg normally placed into a ground-engaging position but mounted on the upper portion for pivoting when the leg hits the ground while the towing vehicle is moving; and means for returning the leg to its ground-engaging position after pivoting thereof from that position; and wherein the first hitch section comprises:

a mechanism for detachably connecting the hitch pin to the first hitch section; and a ramp means which, upon moving the towing vehicle toward the trailing vehicle, engages the flared recess whereby this flared recess slides on the ramp means in order to guide the hitch pin toward the above mentioned mechanism.

According to preferred embodiments, (a) the lower portion of the guidable means comprises two legs normally positioned into a ground-engaging position but mounted on the upper portion for pivoting when these legs hit the ground while the towing vehicle is moving, (b) the second hitch section comprises means for returning the legs to their ground-engaging position after pivoting thereof from that position, (c) the means for returning the legs to their ground-engaging position comprises a tension spring means having a first end connected to the legs and a second end connectable to a point of the tongue distant from the free end thereof, (d) each leg is connected to the upper portion of the guidable means through a pivot, and (e) the first end of the spring means is connected to the legs at points distant from these pivots.

The objects, advantages and other features of the present invention will become more apparent upon reading of the following non restrictive description of preferred embodiments thereof, given by way of example only with reference to the accompanying drawings.

BRIEF DESCRIPTION OF THE DRAWING

In the appended drawings:

FIG. 1 is a side elevational view of a preferred embodiment of the first hitch section mounted on the draw bar of a tractor;

FIG. 2 is an enlarged, side elevational view of the connection of the first hitch section of FIG. 1 to the draw bar of the tractor;

FIG. 3 is a rear elevational view of the first hitch section of FIG. 1;

FIG. 4 is a top plan view of the first hitch section of FIG. 1;

FIG. 7 is a side elevational view of a second embodiment of the second hitch section; and FIG. 8 is a perspective view of the second hitch section of FIG. 7.

DETAILED DESCRIPTION OF THE PREFERRED EMBODIMENTS

Figure 5:
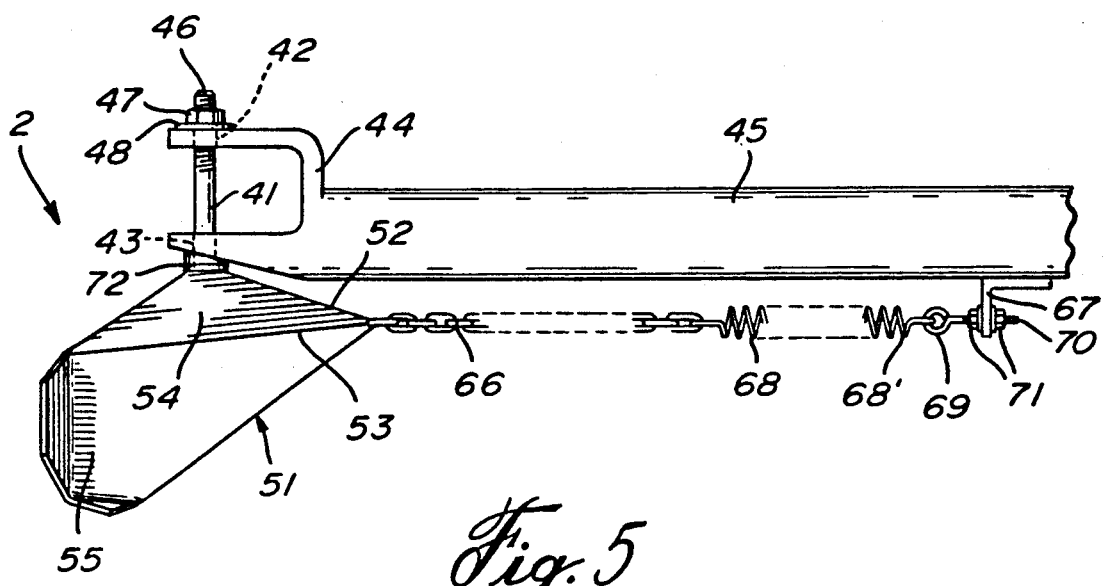
FIG. 5 is a side elevational view of a first embodiment of the second hitch section.

The automatic hitch system in accordance with the present invention comprises a first hitch section and a second hitch section. In the appended drawings, the first hitch section and the second hitch section are generally identified by the references 1 and 2, respectively.

As illustrated in FIG. 1, the hitch section 1 includes an elongate, horizontal top plate 3 preferably made of steel. A steel tube section 4, rectangular in cross section, is welded under the top plate 3. The tube section 4 is dimensioned to slidingly receive the draw bar 5 of a tractor 6.

The free end of the draw bar 5 is provided with a vertically extending hole 6 (FIG. 2) therein. To install the hitch section 1 on the tractor 6, vertically extending and coaxial holes 7 and 8 are drilled in the top plate 3 and the top and bottom walls of the tube section 4. The tube section 4 is then slid over the draw bar 5 until the hole 6 is aligned with the holes 7 and 8. A pin 9 is finally inserted in these three aligned holes and blocked therein.

As shown in FIG. 1, the distal end of the tube section 4 is cut obliquely. A longitudinal steel bar 10 (FIGS. 1 and 3) has an edge 10' welded to the underside of the plate 3. A first angle iron 11 has a proximate end welded to the left side of the bar 10, the underside of the plate 3 and the oblique distal end of the tube section 4. Similarly, a second angle iron 12 has a proximate end welded to the right side of the bar 10, the underside of the plate 3 and the oblique distal end of the tube section 4. As illustrated in FIG. 1, the angle irons 11 and 12 are oblique with respect to the longitudinal axis of the tube section 4. More specifically, the angle irons 11 and 12 extend rearwardly and downwardly from their welded proximate ends.

A thick guide plate 13 is pivotally mounted between parallel walls of the angle irons 11 and 12 through a bolt-and-nut assembly 14. A hole 15 is drilled through the guide plate 13 in the proximity of its lower edge 13'. This hole 15 receives the distal end of a helicoidal spring 16. The proximate end of the spring 16 is attached to an eye 17 provided at one end of a threaded rod 18. The threaded rod 18 is itself locked in the hole of a bracket 20 by means of a pair of nuts 19 screwed on opposite sides of bracket 20. Of course, the bracket 20 is welded to the tube section 4. The tension in the spring can therefore be adjusted through adjustment of the position of the nuts 19 along the threaded rod 18.

Referring to FIG. 1, the guide plate 13 comprises a front upper corner 21 which is applied on the lower edge of the bar 10 by the tension produced through the spring 16. The lower end 22 of the guide plate 13 is rounded to slide on the ground when the tractor rides on irregular terrain. When the rounded lower end 22 hits the ground, the guide plate 13 pivots about the bolt-and-nut assembly 14 in direction 23 against the tension force produced by the spring 16 When the rounded end 22 no longer contacts the ground, the tensioned spring 16 re-applies the corner 21 on the lower edge of the bar 10 to thereby return the guide plate 13 back to its normal position of FIG. 1. Accordingly, the guide plate 13, and more generally the hitch section 1 will not interfere with forward and rearward displacement of the tractor 6.

A mechanism 24 for detachably connecting the hitch pin 41 (FIGS. 5 and 6) or 76 (FIGS. 7 and 8) is illustrated in FIG. 4.

The mechanism 24 comprises the distal end of the top plate 3 formed with a V-shaped cut 25. The V-shaped cut 25 of the plate 3 will guide the hitch pin 41 or 76 toward the semicircular bottom 26 of the V-shaped cut 25.

On the top surface of the horizontal plate 3, a locking member 27 is pivotally mounted about a vertical pivot 28. This pivot 28 is welded to the top surface of the plate 3. Of course, the member 27 is locked on the pivot 28.

Let's presume that the locking member 27 is in the full-line position shown in FIG. 4 and that the hitch pin is guided by the V-shaped cut 25 toward the semicircular bottom 26. During its course, the hitch pin pushes the arcuate edge 29 to rotate the locking member 27 about the pivot 28 until the member 27 reaches its dashed-line position of FIG. 4. In this position, the hitch pin is situated both in the semicircular bottom 26 of the V-shaped cut 25 and the bottom of a rounded recess 30 formed into the member 27.

The locking member 27 is blocked in its dashed-line position of FIG. 4 by means of (a) an angular notch 31 formed in the edge of this member 27, and (b) a blocking device 32. The device 32 comprises a tube section 33 having a square cross section, a closed end 34 and an open, oblique end 35. A rod 36 is slidingly positioned in a hole drilled in the closed end 34 of the tube section 33. The outer end of the rod 36 is provided with an eye 37 while the inner end of this rod 36 is welded to a solid and elongated rectangular steel block 38 slidingly engaged in the tube section 33. Finally, an helicoidal spring 39 is wound on the rod 36 between the end 34 of the tube section 33 and the block 38. Accordingly, the spring 39 applies a pressure on the solid block 38 in direction 40.

Therefore, as soon as the locking member 27 reaches its dashed-line position of FIG. 4, the spring 39 pushes the rectangular block 38 in the angular notch 31 to block the member 27 in this position. The hitch pin is then locked in the semicircular bottom 26 of the V-shaped cut 25 by means of the recess 30 of the member 27. The trailer (or more generally the trailing vehicle) can then be towed by the tractor 6.

To release the hitch pin 41 or 76, a cable 75 (FIGS. 1 and 4) can be pulled (arrow 73) by the driver of the tractor 6, through a pulley 112 to thereby pull the rod 36 and withdraw the block 38 from angular notch 31 whereby the member 27 is free to rotate about pivot 28 back to its full-line position of FIG. 4. The hitch pin is then released from the semicircular bottom 26 of the V-shaped cut 25.

Figure 6:
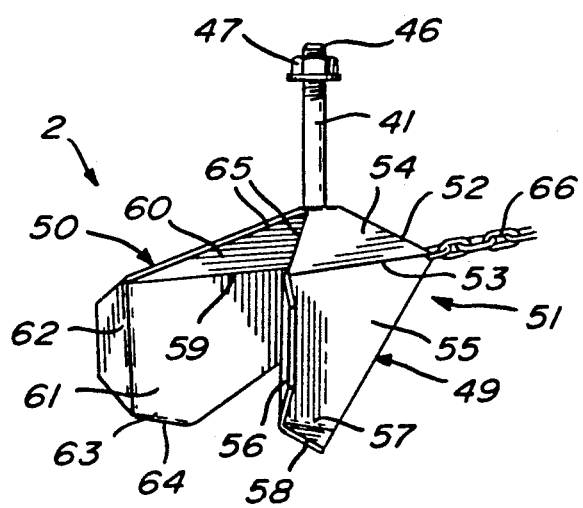
FIG. 6 is a perspective view of the second hitch section of FIG. 5.

A first embodiment of the second hitch section 2 is illustrated in FIGS. 5 and 6. The hitch section 2 comprises the hitch pin 41 passing through the vertically aligned holes 42 and 43 of a conventional U-shaped bracket 44 installed on the free end of forwardly extending tongue 45. The upper end 46 of the pin 41 is threaded to receive a nut 47 to thereby install the hitch section 2 on the free end of the tongue 45. A washer 48 is interposed between nut 47 and the top surface of the upper branch of the U-shaped bracket 44.

A pair of steel plates 49 and 50 are welded to each other along a straight line 52. As can be seen, plates 49 and 50 are symmetrical about the plane containing both line 52 and the longitudinal axis of the pin 41.

More specifically, plate 49 is bent along line 53 to define an inclined, upper triangular plate portion 54 and a generally vertical triangular plate portion 55, while plate 50 is bent along line 59 to define an upper triangular plate portion 60 and a generally vertical triangular plate portion 61. The generally vertical front borders 56 and 62 of plate portions 55 and 61 are bent outwardly to increase the width of the front mouth of the hitch portion 2. The lower angles 57 and 63 of the triangular plate portions 55 and 61 are also bent outwardly to increase the surfaces of contact 58 and 64 with the ground.

The plates 49 and 50 therefore define a guidable member 51 comprising a pyramidal upper portion formed by the two triangular plate portions 54 and 60. This pyramidal upper portion comprises a V-shaped guide recess 65 formed by the absence of one triangular wall of the pyramid. As illustrated in FIGS. 5 and 6, the lower end of the hitch pin 41 is welded to the vertex of the pyramidal upper portion of this guidable member 51. Regarding the two generally vertical triangular plate portions 55 and 61, they define a lower ground-engaging portion of the guidable member 51.

FIG. 5 demonstrates that the pyramidal configuration of the upper portion of the guidable member 51 presents the advantage of adapting the hitch section to many configurations of tongue free ends.

The pyramidal upper portion of the guidable member 51 comprises a rear tip to which is attached the first end of a chain 66. The other end of the chain 66 is attached to a right angle bracket 67 through an helicoidal spring 68. The horizontal portion of the right angle bracket 67 is welded to the underside of the tongue 45. The end 68' of the chain 68 is attached to an eye 69 provided at one end of a threaded rod 70. The threaded rod 70 passes through a hole drilled in the vertical portion of the right angle bracket 67 and is fixed by means of a pair of nuts 71 screwed on the threaded rod 70 on opposite sides of the vertical portion of bracket 67. Tension in the spring 68 can therefore be adjusted by displacing the nuts 71 along the threaded rod 70.

Washers 72 are interposed between the lower branch of the U-shaped bracket 44 and the pyramidal upper portion of the guidable member 51 to facilitate rotation of the latter member 51 about the pin 41.

In operation, to hitch the trailer (or more generally the trailing vehicle), the free end of the tongue 45 is supported by the guidable member 51 of which the undersides 58 and 64 of the bent angles 57 and 63 engage the ground. The tractor 6 is displaced rearwardly until the guide plate 13 penetrates the front mouth of the guidable member 51. The V-shaped recess 65 (FIG. 6) then engages the sloped edge 74 (FIG. 1) of the guide plate 13 and slides on this ramp 74. The free end of the tongue 45 raises until the hitch pin 41 engages the V-shaped cut 25 (FIG. 4) and is guided toward the semicircular bottom 26. During its course, the hitch pin 45 pushes the arcuate edge surface 29 to rotate the locking member 27 about the pivot 28 from its full-line position to its dashed-line position (FIG. 4). In the dashed-line position, the hitch pin 41 is situated both in the semicircular bottom 26 of the V-shaped cut 25 and the recess 30 of the locking member 27. The locking member 27 is then blocked by means of the elongated block 38 pushed in the angular notch 31 by the spring 39 as explained in the foregoing description.

The trailer (or more generally the trailing vehicle) can then be towed. When the tractor 6 turns, the guidable member 51 will pivot on the free end of the tongue 45 about the pin 41 to follow this movement. The spring 68 stretches to enable this pivotal movement of the guidable member 51. When the turn is completed, the tension in the spring 68 will return the guidable member 51 in its stable angular position of FIG. 5.

To subsequently decouple the trailer (or more generally the trailing vehicle), the cable 75 (FIGS. 1 and 4) is pulled (arrow 73) by the driver of the tractor 6 to pull the rod 36, withdraw the block 38 from the angular notch 31, and enable rotation of the locking member 27 about the pivot 28 from its dashed-line position to its full-line position (FIG. 4) to thereby release the pin 41 as described in the foregoing description. Forward displacement of the tractor 6 will cause sliding of the V-shaped recess 65 on the ramp 74 until the surfaces 58 and 64 (FIG. 6) rest on the ground.

A second embodiment of the hitch section 2 is illustrated in FIGS. 7 and 8. This second embodiment comprises a vertical hitch pin 76 passing through the holes 77 and 78 of the U-shaped bracket 79 of the free end of the forwardly extending tongue 80 of a trailer (or more generally a trailing vehicle). The upper end 81 of the hitch pin 76 is threaded to receive a nut 82 in order to install the hitch section 2 on the tongue 80. A washer 83 is interposed between the nut 82 and the top surface of the upper branch of the U-shaped bracket 79.

A guidable member 84, made of steel plate, is welded to the lower end of the pin 76. The guidable member 84 comprises an horizontal, generally triangular flat portion 85. As shown in FIG. 8, the generally triangular plate portion 85 is formed with a V-shaped guide recess 86. To the two other edges of the triangular plate portion 85 are appended respective triangular and vertical plate portions 87 and 88.

A first ground-engaging leg 89, L-shaped in cross section, is pivotally mounted on the plate portion 87 through a bolt-and-nut assembly 91. The upper front corner 92 of the leg 89 is bent to rest on the edge 93 of the triangular plate portion 87 and thereby limit pivotal movement of the leg 89 about the bolt-and-nut assembly 91 in direction 94 (FIG. 8).

A second ground-engaging leg 90, L-shaped in cross section, is pivotally mounted on the plate portion 88 through a bolt-and-nut assembly 95. The front upper corner 96 of the leg 90 is bent to rest on the edge 97 of the triangular plate portion 88 and thereby limit pivotal movement of the leg 90 about the bolt-and-nut assembly 95 in direction 98 (FIG. 8).

A first chain section 99 has a first end welded to the upper rear corner 102 of the leg 89 while a second chain section 100 has a first end welded to the upper rear corner 103 of the leg 90. The other ends of the chain sections 99 and 100 are interconnected at a common point 104 along with the first end of a third chain section 105. The other end of the third chain section 105 is attached to a right angle bracket 106 through an helicoidal spring 107. The horizontal portion of the right angle bracket 106 is welded to the underside of the tongue 80. The end 107' of the spring 107 is attached to an eye 108 provided at one end of a threaded rod 109. The threaded rod 109 passes through a hole drilled in the vertical portion of the right angle bracket 106 and is fixed by means of a pair of nuts 110 screwed on the threaded rod 109 on opposite sides of the vertical portion of the bracket 106. Tension in the spring 107 can therefore be adjusted by displacing the nuts 110 along the threaded rod 109.

At least one washer (not shown) is interposed between the lower branch of the U-shaped bracket 79 and the top surface of plate portion 85 to facilitate rotation of the guide member 84 on the tongue 80 about the hitch pin 76.

In operation, to hitch the trailer (or more generally the trailing vehicle), the free end of the tongue is supported above the ground by the guiding member 84 of which the lower ends of the legs 89 and 90 engage the ground. The tractor 6 is displaced rearwardly until the edge 74 of the guide plate 13 engages the V-shaped recess 86 of the guidable member 84. This V-shaped recess 86 then slides on this ramp 74 to raise the free end of the tongue 80 until the hitch pin 76 engages the V-shaped cut 25 and is guided toward the semicircular bottom 26. During its course, the pin 76 pushes the arcuate edge surface 29 (FIG. 4) to rotate the locking member 27 about the pivot 28 until this member 27 reaches its dashed-line position shown in FIG. 4. The hitch pin 76 is then situated both in the semicircular bottom 26 of the V-shaped cut 25 and the recess 30 of member 27. The locking member 27 is then blocked in its dashed-line position by means of the elongated block 38 pushed in the angular notch 31 by the spring 39 as explained in the foregoing description.

The trailer (or more generally the trailing vehicle) can then be towed. When the tractor turns, the guidable member 84 will pivot on the tongue 80 about the pin 76 to follow this movement. Also, when the lower ends of the legs 89 and 90 hit the ground while the tractor 6 is moving, the legs 89 and 90 pivot in direction (FIG. 7) about the respective bolt-and-nut assemblies 91 and 95. The spring 107 stretches to enable rotational movement of the guidable member 84 about pin 76 and pivoting of the legs 89 and 90 about the assemblies 91 and 95. The tension in the spring 107 will subsequently return the guidable member 84 in its stable angular position of FIG. 7 and the legs 89 and 90 in their normal ground-engaging position of FIG. 8.

To subsequently decouple the trailer (or more generally the trailing vehicle), the cable 75 (FIGS. 1 and 4) is pulled (arrow 73) by the driver of the tractor 6 to pull the rod 36, withdraw the block 38 from the angular notch 31, and enable rotation of the locking member 27 about the pivot 28 from its dashed-line position to its full-line position (FIG. 4) to thereby release the pin 76 as described in the foregoing description. Forward displacement of the tractor 6 will cause sliding of the V-shaped recess 86 on the ramp 74 until the lower ends of the legs 89 and 90 (FIG. 6) rest on the ground.

Although the present invention has been described hereinabove by way of preferred embodiments thereof, such embodiments can be modified at will, within the scope of the appended claims, without departing from the spirit and nature of the present invention.

What is claimed is:

1. A system for hitching to a towing vehicle a trailing vehicle including a forwardly extending tongue provided with a free end, comprising a first hitch section to be mounted on said towing vehicle and a second hitch section to be mounted on said trailing vehicle, wherein said second hitch section comprises:

a hitch pin to be mounted generally vertically on said free end of the tongue whereby said pin has a lower end; and a guidable means having a ground-engaging lower portion connected to a pyramidal upper portion, said pyramidal upper portion defining a plurality of mutually interconnected triangular walls and a vertex secured to said lower end of the hitch pin, said pyramidal upper portion including a generally flared guide recess formed by the absence of one of said triangular walls; wherein said first hitch section comprises:

a mechanism for detachably connecting the hitch pin to said first hitch section; and a ramp means which, upon moving said towing vehicle toward said trailing vehicle, engages the flared recess whereby said flared recess slides on said ramp means in order to guide the hitch pin toward said mechanism.

2. A system as recited in claim 1, wherein said pyramidal upper portion comprises two triangular walls having respective bases, and wherein said ground-engaging lower portion comprises two triangular plates each having one side secured to the base of one of said two triangular walls.

3. A system as recited in claim 1, wherein said hitch pin is pivotally mounted on said free end of the tongue, and wherein said second hitch section further comprises a tension spring means having a first end connected to said guidable means and a second end to be connected to a point of the tongue distant from said free end thereof, said spring means producing a tension force capable f returning said guidable means and hitch pin to a substantially stable angular position after pivoting of said guidable mean and hitch pin from said stable position.

4. A system for hitching to a towing vehicle a trailing vehicle including a forwardly extending tongue provided with a free end, comprising a first hitch section to be mounted on said towing vehicle and a second hitch section to be mounted on said trailing vehicle, wherein said second hitch section comprises:
   a hitch pin to be mounted generally vertically on said free end of the tongue whereby said pin has a lower end;
   a guidable mean having (a) an upper portion secured to the lower end of said pins and formed with a generally flared guide recess, and (b) a lower portion including at least one ground-engaging leg normally placed into a ground-engaging position and pivotally mounted on said upper portion for pivoting when said at least one leg hits the ground while said towing vehicle is moving; and
   means for returning said at least one leg to said ground-engaging position after pivoting thereof from said ground-engaging position, said returning means comprising a tension spring means having first and second ends, first means for connecting said first end of the tension spring means to said at least one leg and second means for connecting said second end of the tension spring means o a point of si ad tongue distant from said free end thereof;
   wherein said first hitch section comprises:
   a mechanism for detachably connecting the hitch pin to said first hitch section; and
   a ramp means which, upon moving said towing vehicle toward said trailing vehicle, engages the flared recess whereby said flared recess slides on said ramp means in order to guide the hitch pin toward said mechanism.

5. The hitching system of claim 4, wherein said at least one leg is mounted on said upper portion of the guidable means through a pivot, and wherein said first end of the spring means is connected to said leg at a point distant form said pivot.

6. The hitching system of claim 4, in which said lower portion of said guidable means comprises two legs normally placed into a ground-engaging position but mounted on said upper portion for pivoting when said legs hit the ground while said towing vehicle is moving.

7. The hitching system of claim 6, wherein each of said legs is connected to said upper portion of the guidable means through a pivot, and wherein said first connecting means comprises means for connecting said first end of the spring means to said legs at points distant from said pivots.

8. The hitching system of claim 4, wherein said hitch pin is pivotally mounted on said free end of the tongue, and said second hitch section comprises a tension spring means having first and second ends, first means for connecting said first end to said guidable means and a second means for connecting said second end to a point of said tongue distant from said free end thereof, said spring means producing a tension force capable of returning said guidable means and hitch pin to a substantially stable angular position after pivoting of said guidable mean and hitch pin from said stable position.

9. A hitching section to be mounted on a trailing vehicle to be hitched to a towing vehicle, said trailing vehicle including a forwardly extending tongue provided with a free end, said hitch section comprising:
   a hitch pin to be mounted generally vertically on said free end of the tongue whereby said pin has a lower end; and
   a guidable means having a ground-engaging lower portion connected to a pyramidal upper portion, said pyramidal upper portion defining a plurality of mutually interconnected triangular wall sand a vertex secured to said lower end of the hitch pin, said pyramidal upper portion including a generally flared guide recess formed by the absence of one of said triangular walls and capable, upon moving said towing vehicle toward said trailing vehicle, of engaging and sliding on a ramp means of said towing vehicle in order to guide the hitch pin toward a mechanism for detachably connecting said pin to said towing vehicle.

10. A hitch section as recited in claim 9, wherein said pin is pivotally mounted on said free end of the tongue, and wherein said hitch section further comprises a tension spring means having first and second ends, first means for connecting said first end to said guidable means and a second means for connecting said second end to a point of said tongue distant from said free end thereof, said spring means producing a tension force capable of returning said guidable means and hitch pin to a substantially stable angular position after pivoting of said guidable mean and hitch pin form said stable position.

11. A hitch section to be mounted on a trailing vehicle to be hitched to a towing vehicle, said trailing vehicle including a forwardly extending tongue provided with a free end, said hitch section comprising:
   a hitch pin to be mounted generally vertically on said free end of the tongue whereby said pin has a lower end;
   a guidable means having an upper portion secured to the lower end of said pin and formed with a generally flared guide recess, and (b) a lower portion including at least one ground-engaging leg normally placed into a ground-engaging position and pivotally mounted on said upper portion for pivoting when said at least one leg hits the ground while said towing vehicle is moving; and
   means for returning said at least one leg into said ground-engaging position after pivoting thereof from said ground-engaging position, said returning means comprising a tension spring means having first and second ends, first means for connecting said first end of the tension spring means to said leg and second means for connecting said second end of the tension spring means to a point of said tongue distant from said free end thereof;
   whereby, upon moving said towing vehicle toward said trailing vehicle, the flared recess is capable of engaging and sliding on a ramp means of said towing vehicle in order to guide the hitch pin toward a mechanism of detachably connecting said pin to said towing vehicle.

12. The hitch section of claim 11, wherein said at least one leg is mounted on said upper portion of the guidable means through a pivot, and wherein said first end of the spring means is connected to said leg at a point distant form said pivot.

13. The hitching system of claim 11, in which (a) said lower portion of said guidable mean comprises two legs normally positioned into a ground-engaging position but each connected to said upper portion through a pivot for pivoting when said legs hit the ground while said towing vehicle is moving, and (b) said first connecting means comprising means for connecting the first end of the spring means to said legs at points distant from said pivots.

14. The hitch section of claim 11, wherein said pin is pivotally mounted on said free end of the tongue, and said second hitch section comprises a tension spring means having first and second ends, first means for connecting said first end to said guidable means and a second means for connecting said second end to a point of said tongue distant from said free end hereof, said spring means producing a tension fore capable f returning said guidable means and hitch pin to a substantially stable angular position after pivoting of said guidable means and hitch in from said stable position.

* * * * *